(12) United States Patent
Ibarra

(10) Patent No.: US 10,244,511 B1
(45) Date of Patent: Mar. 26, 2019

(54) SYSTEMS AND METHODS FOR SELECTING A NODE MANAGEMENT DEVICE IN A WIRELESS NETWORK

(71) Applicant: SYNAPSE WIRELESS, INC., Huntsville, AL (US)

(72) Inventor: Eric Joseph Ibarra, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 6 days.

(21) Appl. No.: 15/692,183

(22) Filed: Aug. 31, 2017

(51) Int. Cl.
*H04W 72/04* (2009.01)
*H04W 80/04* (2009.01)
*H04W 92/02* (2009.01)

(52) U.S. Cl.
CPC ........ *H04W 72/0406* (2013.01); *H04W 80/04* (2013.01); *H04W 92/02* (2013.01)

(58) Field of Classification Search
CPC ........................... H04W 72/04; H04W 72/0406
See application file for complete search history.

(56) References Cited

U.S. PATENT DOCUMENTS

| | | |
|---|---|---|
| 8,081,590 B2 | 12/2011 | Patterson et al. |
| 8,755,312 B2 | 6/2014 | Liang et al. |
| 8,792,401 B2 | 7/2014 | Banks et al. |
| 8,976,795 B2 | 3/2015 | Kuehnel et al. |
| 9,298,954 B1 | 3/2016 | Ewing |
| 9,742,621 B2 | 8/2017 | Joseph et al. |
| 9,749,850 B2 | 8/2017 | Bergquist et al. |

*Primary Examiner* — Christopher M Brandt
(74) *Attorney, Agent, or Firm* — Maynard Cooper & Gale, P.C.; Jon E. Holland

(57) ABSTRACT

Systems and methods for selecting a node management device for a node of a wireless network are provided. The node can receive advertisements from two or more node management devices communicatively coupled to the node over a predetermined time period. Upon the expiration of the predetermined time period, the node can select a node management device based on the number of advertisements received from that node management device. The node can then link to the selected node management device and use that node management device for communications. The node can also continue to monitor for advertisements from the node management devices and can decide to select a different node management device based on the number of advertisements received from the other node management devices.

20 Claims, 5 Drawing Sheets

SYSTEMS AND METHODS FOR SELECTING A NODE MANAGEMENT DEVICE IN A WIRELESS NETWORK

BACKGROUND

The present application generally relates to systems and methods for selecting a node management device in a wireless network.

A wireless network can have a plurality of network nodes that can communicate with one another. Each of the network nodes in the wireless network can have a corresponding node management device, which may be a network access device (e.g., a gateway), a coordinator or other device configured to manage the network node. In some cases, such as when a node management device is implemented as gateway, the node management device may provide access to other portions of the network or other networks. The node management device can be used to perform management functions for the network node such as the providing of configuration and/or software updates to the network node, facilitate communication between the network node and other portions of the wireless network and/or other networks and/or devices, coordinate communication times by the network node, and/or control operational states of the network node (e.g., entering and exiting a sleep state). In larger wireless networks, multiple node management devices can be deployed to help scale the wireless network for the number of nodes. Typically, a node can be provided with a node management device when it is installed and/or commissioned. The node management device for the node can either be assigned by the installer or automatically selected by the node during the commissioning process.

Some tools and techniques have been developed to aid the installer or the network node in the selection of an appropriate node management device using a combination of physical location or topology information including the number of hops and signal strength between network nodes and a node management device. While current tools and techniques can be effective in identifying the closest node management device to a node, the tools and techniques may lack the ability to select the most reliable node management device (i.e., the node management device that provides the most consistent communications) for a node. The closest node management device to a node may not be the most reliable node management device for that node depending on various factors such as congestion at the node management device. Further, many current tools and techniques do not provide any mechanism for a node to change node management devices, if the current node management device of a node should become less reliable as a result of increased traffic through the node management device.

SUMMARY

The present application generally pertains to systems and methods for selecting a reliable node management device for a node of a wireless network. A reliable node management device can be the node management device that provides for the most consistent communications (e.g., communications with the lowest latency and/or fewest dropped messages) between the node management device and the node. One approach to measuring reliability directly (versus inferring a predicted reliability based on a combination of other inputs) is to determine the number of advertisements received from each of the node management devices communicating with a node in any given period. The number of received advertisements from a node management device can correspond to the reliability of the path and/or the node management device. Another approach to measuring reliability is to measure the receipt of node management device advertisements by a node versus the expected number of advertisements to be received by the node in any given period. In each node, an array can be allocated per node management device that can be used to track advertisements. As advertisements are received by the node, information can be stored in the array indicating receipt of the advertisement. At the end of a time period for receiving advertisements, the reliability of the node management device can be determined based on the number of received advertisement indications stored in the array.

After determining the reliability of each of the node management devices being tracked, the node can then select a reliable link or node management device. The process for selecting a node management device can be periodically repeated such that the node is communicating with a reliable node management device. If changing node management devices too frequently becomes undesirable in an application, hysteresis can be applied to the decision to switch from the current node management device for the node to the node management device determined to be most reliable. The use of hysteresis can allow for temporary variations in reliability determinations to not impact the use of the current node management device. To further enhance the determination of reliability, the size of the array can be increased without sacrificing the latency of decision making by applying a higher weight to the most recent indications and descending weights to the older indications. The weights can be customized per application to meet the latency requirements for node management device re-selection.

In one embodiment, the array for storing indications can be an array of bits that can be used to track advertisements. In the array, each bit can correspond to a single advertisement from the node management device. As advertisements are received by the node, the bit for that corresponding advertisement can be set (e.g., a 1 is stored). The reliability of the node management device can be calculated for the period of time being tracked by counting the number of bits that are set and dividing the total number of bits. In addition, when the number of advertisements that were sent by the node management device equals the number of bits in the array, the transmission of subsequent advertisements by the node management device can cause the bits of the array to be shifted such that the least significant bit, which represents the oldest advertisement, is shifted out of the array, thereby creating a rolling window of the number of received advertisements.

One advantage of the present application is that a node can use the node management device that provides the most reliable communication path for that node.

Another advantage of the present application is that the node can automatically update the node management device used by the node to maintain the most reliable communication path for that node.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
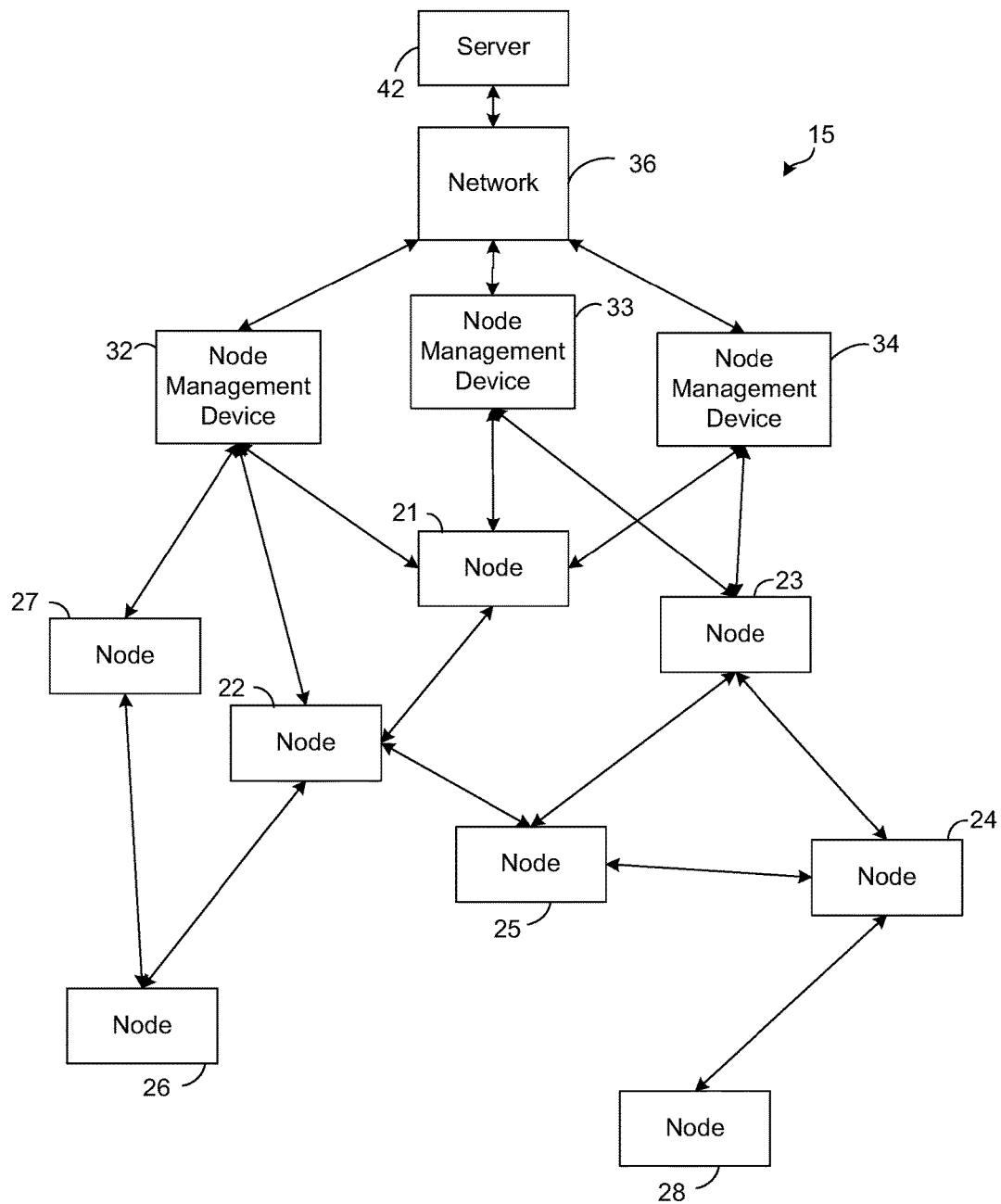
FIG. 1 is a block diagram showing an embodiment of a wireless network.

FIG. 1 shows an embodiment of a wireless network 15. The wireless network 15 can have a plurality of nodes 21-28. In one embodiment, the nodes 21-28 can be stationary (i.e., the position of the node does not change), but, in other embodiments, any of the nodes 21-28 may be portable (i.e., the position of the node can change). FIG. 1 depicts eight nodes 21-28 for simplicity, but the network 15 may have any number of nodes 21-28 in other embodiments. In one embodiment, each node 21-28 may be positioned at a specific location at or within a facility, e.g., a particular room or area of a building. In another embodiment, the network 15 can be implemented as a mesh network or an ad hoc network, but other types of networks may be implemented in other embodiments. An example of a network that can be used with the present application is described in commonly-assigned U.S. Pat. No. 9,619,989, entitled "Asset Tracking Systems and Methods," and granted on Apr. 11, 2017, which patent is incorporated herein by reference.

The nodes 21-28 can be used for several different purposes. For example, the nodes 21-28 may be connected to one or more components at the facility (e.g., light sources) and used to facilitate the communication of instructions to the components. The nodes 21-28 may also be connected to one or more sensors or cameras to facilitate the communication of information from the sensors or cameras. Further, the nodes 21-28 may be incorporated into an asset tracking system and configured to communicate with one or more devices (e.g., tags).

Each node 21-28 is able to communicate with one or more of the other nodes 21-28. In one embodiment, the nodes 21-28 can communicate among one another wirelessly (i.e., via electromagnetic or acoustic waves carrying a signal), but it is possible for any of the nodes 21-28 to communicate over a conductive medium (e.g., a wire or fiber, or otherwise). Messages may hop from node-to-node in order to reach a destination. For example, in the embodiment shown by FIG. 1, the nodes 23-25 are within range of each other such that any of the nodes 23-25 can communicate directly with any of the other nodes 23-25. However, the node 28 is only within range of node 24. The other nodes 23 and 25 can use the node 24 to route or otherwise transmit a message to the node 28.

The network 15 can also include a plurality of node management devices 32-34. In one embodiment, the node management devices 32-34 can be a gateway, a network access device a coordinator or other similar type of device. The node management devices 32-34 can be responsible for the management of the nodes 21-28 communicatively coupled to the node management device 32-34. For example, the node management devices 32-34 may be responsible for providing configuration and/or software updates to the nodes 21-28, facilitating communications by the nodes 21-28 to other networks or other portions of the current network, coordinating communication times by the nodes 21-28, and controlling an operational state of the nodes 21-28 (e.g., entering and exiting a sleep state). In the embodiment shown in FIG. 1, the nodes 21-28 communicate with corresponding node management devices 32-34 in order to access a network 36, such as a local area network (LAN), a wide area network (WAN) or other type of network (e.g., the Internet). Each node management device 32-34 can be communicatively coupled to at least one of the nodes 21-28. The node management devices 32-34 can interface messages between the protocol for communication with the nodes 21-28 and the protocol for communication with the network 36 in one embodiment. The network 15 can include a server 42 connected to the network 36. In one embodiment, the server 42 can be provisioned to know the network configuration, including the network address or identifier of the nodes 21-28 and any other nodes of the network 15. In other embodiments, the server 42 may be configured to dynamically learn the network configuration. In addition, the server 42 may store data indicating a location of each node 21-28.

Figure 2:
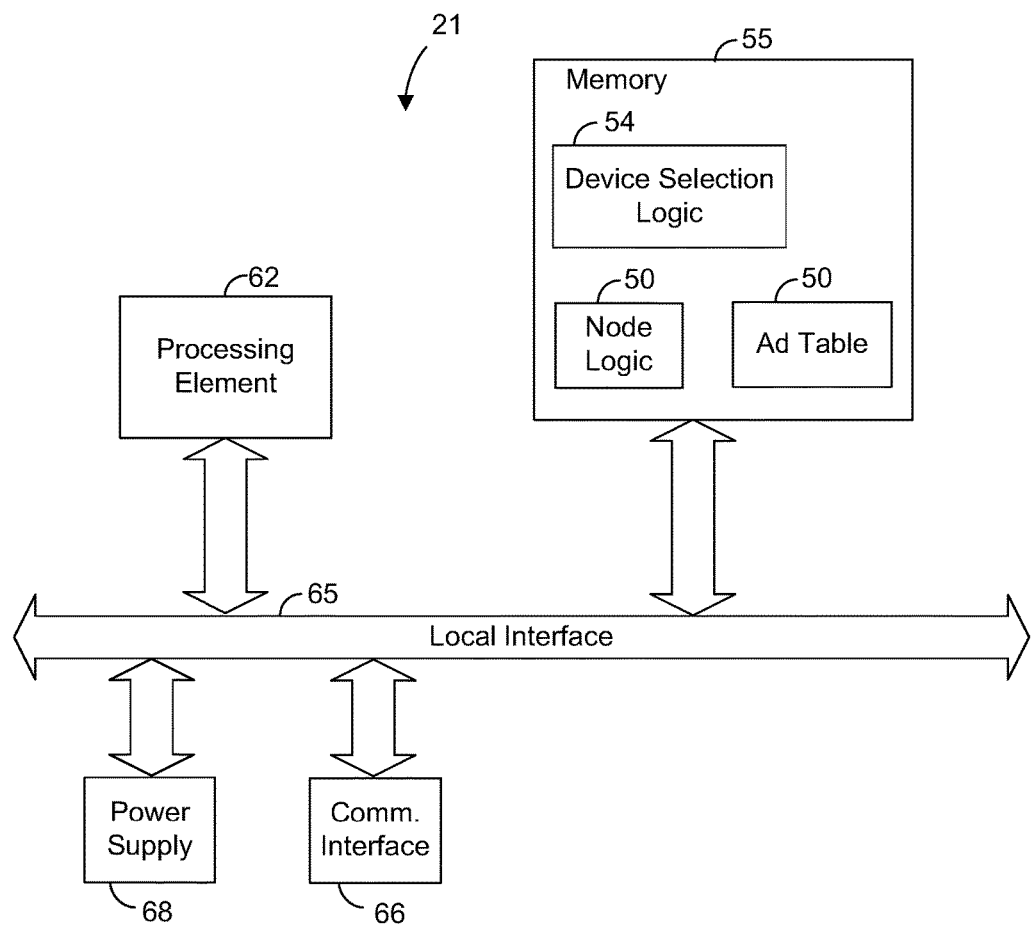
FIG. 2 is a block diagram showing an embodiment of a network node in the wireless network of FIG. 1.

FIG. 2 depicts an embodiment of one of the nodes 21 of the network. Note that any of the other nodes 22-28 may be configured similarly to or identical to the node 21 depicted by FIG. 2. The node 21 shown by FIG. 2 can include logic 50, referred to herein as "node logic," for generally controlling the operation of the node 21. The node 21 also includes logic 54, referred to herein as "device selection logic," for determining the most reliable node management device 32-34 communicatively coupled to the node 21. The node logic 50 and the device selection logic 54 may be implemented in software, firmware, hardware, or any combination thereof. In FIG. 2, the node logic 50 and the device selection logic 54 are implemented in software and stored in memory 55. However, other configurations of the node logic 50 and the device selection logic 54 are possible in other embodiments.

Note that the node logic 50 and the device selection logic 54, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The node 21 includes at least one conventional processing element 62, which includes processing hardware for executing instructions stored in the memory 55. As an example, the processing element 62 may include a central processing unit (CPU) or a digital signal processor (DSP). The processing element 62 communicates to and drives the other elements within the node 21 via a local interface 65, which can include at least one bus.

The node 21 also has a communication interface 66. The communication interface 66 can include a radio frequency (RF) radio or other device for communicating wirelessly. Using the communication interface 66, the node 21 may communicate with the other nodes 22-28, the node management devices 32-34 or other devices incorporated in network 15 (e.g., a tag).

The node 21 can have a power supply 68, which provides electrical power to the components of the node 21. In one embodiment, the power supply 68 has an interface that allows it to plug into or otherwise interface with an external component, such as a wall outlet or battery, and receive electrical power from such external component. If desired, the power supply 68 may incorporate one or more batteries to permit the node 21 to be independent of the external power component.

The device selection logic 54 can identify the most reliable node management device 32-34 for the node 21. The device selection logic 54 can store received information from the node management devices 32-34 in an ad table 50 stored in memory 55. The device selection logic 54 can process the information stored in the ad table 50 regarding each node management device 32-34 to make a determination on which node management device 32-34 can provide the most reliable communication path (e.g., the path with the fewest dropped messages) for the node 21 to the network 36.

Figure 3:
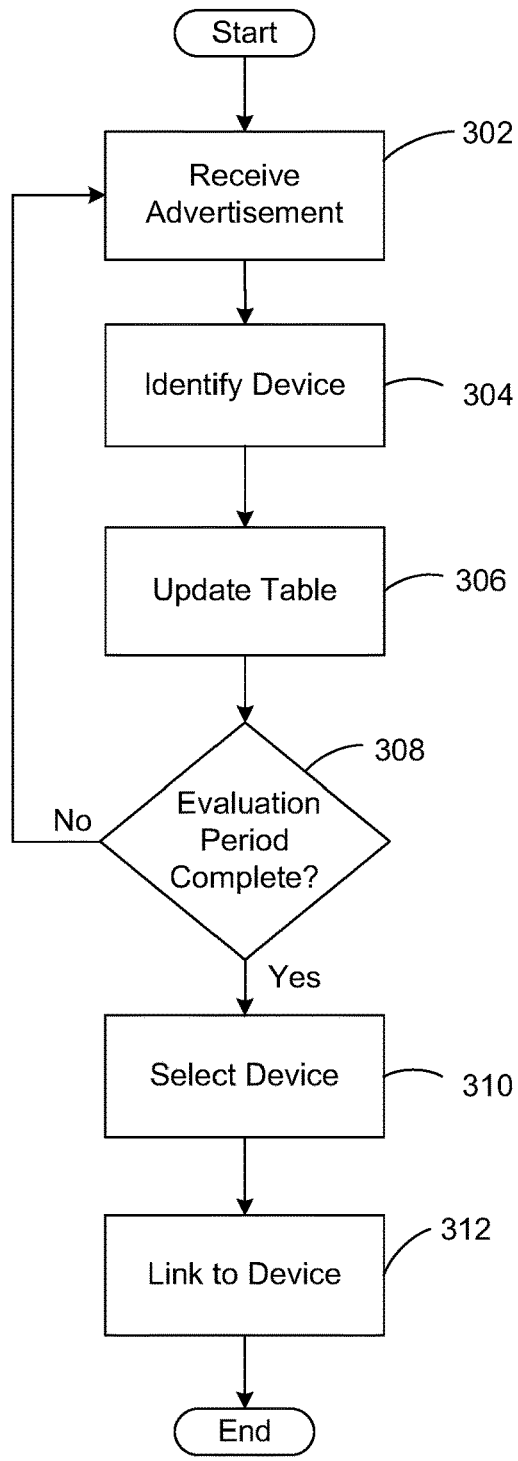
FIG. 3 shows an embodiment of a process for a node to select and link to a node management device.

In one embodiment, as shown by the process in FIG. 3, each node 21-28 can select and link to a node management device 32-34. The process of FIG. 3 can be used by each of the nodes 21-28 to identify a corresponding node management device 32-34 for that node 21-28, such that the node management device 32-34 can manage the node 21-28 and provide access to network 36. The process begins with a node 21-28 receiving an advertising message (advertisement) from one of the node management devices 32-34 (step 302).

Each of the node management devices 32-34 can transmit an advertising message to the nodes 21-28 at a preselected interval (e.g., 1 minute). In one embodiment, the advertising message can be a multicast message that includes information relating to the node management device 32-34 that sent the advertising message (e.g., a network identifier or MAC address for the node management device 32-34). In an embodiment, each of the node management devices 32-34 can transmit advertising messages independently of the other node management devices 32-34. In other embodiments, the node management devices 32-34 may be coordinated such that all the node management devices 32-34 transmit advertising messages at about the same time or the node management devices 32-34 can individually transmit advertising messages in a predefined sequence.

After a node 21-28 receives an advertising message from a node management device 32-34, the node 21-28 identifies the node management device 32-34 that sent the advertising message (step 304) and updates the ad table 50 to indicate that an advertising message was received from the node management device 32-34 (step 306). In one embodiment, the node 21-28 can identify the node management device 32-34 based on information (e.g., a network identifier) in the advertising message. The node 21-28 can then use the identification information of the node management device 32-34 to store an indication of receipt of an advertising message in a table or array associated with the node management device 32-34 in the ad table 50.

Figure 4:
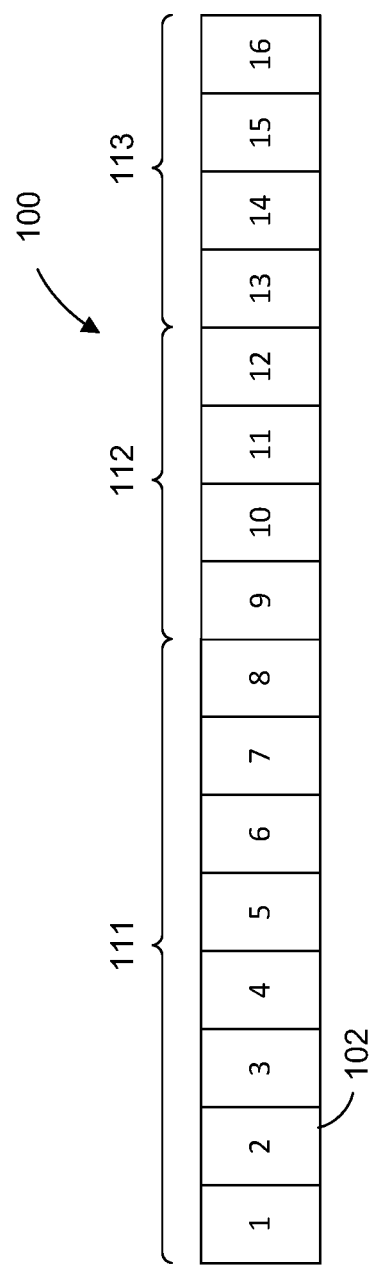
FIG. 4 schematically shows an embodiment of a table storing information regarding receipt of advertisements from a node management device.

FIG. 4 shows an embodiment of a table or array 100 in ad table 50 used to store information regarding advertising messages received from a node management device 32-34. In one embodiment, the table 100 can have a predetermined number of elements or members 102 corresponding to a predetermined number of advertising messages that may be received by the node 21-28 during a predetermined time period. For example, the elements 102 of the table 100 may be bits in a bit mask. Each element 102 can be used to indicate the receipt or non-receipt of an advertising message during a particular portion of the predetermined time period. In the embodiment shown in FIG. 4, the table 100 can include 16 elements 102. However, the table 100 can include more or less than 16 elements 102 in other embodiments. As discussed above, the table 100 can be correlated or related to a specific node management device 32-34 and store information about the receipt of advertising messages from that node management device 32-34. In the embodiment shown in FIG. 4, the elements 102 of table 100 can be further organized into a first group 111, a second group 112 and a third group 113.

In one embodiment, the table can have a "least significant element" corresponding to an element 102 at one end of the table 100 (e.g., the element 102 labelled with a 1 in FIG. 4) and a "most significant element" corresponding to an element at the opposite end of the table 100 (e.g., the element 102 labelled with a 16 in FIG. 4). In an embodiment, each element 102 can correspond to the preselected interval for the node management device 32-34 to transmit an advertising message. In addition, the predetermined number of elements 102 in table 100 can correspond to an evaluation period as discussed in greater detail below. In other words, the predetermined number of elements 102 in the table 100 times the preselected interval for transmitting an advertising message can correspond to the evaluation period.

In an embodiment, if the node 21-28 receives an advertising message from a node management device 32-34 during a preselected interval, the device selection logic 54 can set a bit (e.g., store a 1) in the corresponding element 102 of the table 100 that corresponds to the preselected interval. In contrast, if the node 21-28 does not receive an advertising message from a node management device 32-34 during a preselected interval, the device selection logic 54 can clear a bit (e.g., store a 0) in the corresponding element 102 of the table 100 that corresponds to the preselected interval (or advertising message). In one embodiment, the least significant element of the table 100 can correspond to the first preselected interval and each subsequent preselected interval can correspond to the next adjoining element 102 until the most significant element is used.

In one embodiment, the table 100 can be configured as "rolling window" such that once the most significant element of the table 100 is set or cleared upon the next preselected interval occurring, the least significant element of the table 100 can be cleared or dropped and the values in the remaining elements shifted towards the least significant element such that the most significant element is storing a value that corresponds to the most recent preselected interval for an advertising message from the node management device 32-34. In another embodiment, once the most significant element of the table 100 is set or cleared, the elements 102 of the table can be cleared (e.g., all store a 0) on the next preselected interval and the setting or clearing of the bits can begin again with the least significant element.

Referring back to FIG. 3, the node 21-28 can then determine if the evaluation period is complete for determining the most reliable node management device 32-34 (step 308). In one embodiment, the evaluation period can be a preselected time period (e.g., 16 minutes) that is greater than the preselected interval used to transmit advertising messages by the node management devices 32-34. In other words, a node 21-28 can receive multiple advertising messages from a node management device 32-34 within the evaluation period. If the evaluation period is not complete or has not expired, the node 21-28 can return to continue to detect for advertising messages from the node management devices 32-34. In another embodiment, one evaluation period may be used for the first time a node 21-28 selects a node management device 32-34 and different evaluation periods may be used when the node 21-28 is reselecting a node management device 32-34. For example, the first evaluation period may be long enough to fill the table 100, but subsequent evaluation periods may only fill a portion of the table 100 and either use only the recently filled portion of the table 100 or use both the recently filled portion of the table and previously filled portions of the table 100.

If the evaluation period is completed or has expired, the node 21-28 then selects a node management device 32-34 that provides the most reliable communication path for the node 21-28 (step 310). As discussed in greater detail below with regard to FIG. 5, the device selection logic 54 of the node 21-28 evaluates the information in the ad table 50 pertaining to each of the node management devices 32-34 and determines which of the node management devices 32-34 can provide the most reliable communications for the node 21-28 based on the number of advertising messages received from the node management device 32-34. In one embodiment, the node 21-28 may select the node management device 32-34 that sent the most advertising messages received by the node 21-28 (e.g., the node 21-28 may select the array for the node management device 32-34 with the most set bits). Once the node management device 32-34 is selected by the node 21-28, the node 21-28 can then link to the selected node management device 32-34 (step 312) by sending a message to the selected node management device 32-34 or by using other suitable linking or connecting techniques. Once the node 21-28 and the node management device 32-34 are linked, the node management device 32-34 can be responsible for managing communications with the node 21-28 in accordance with standard techniques.

The process of FIG. 3 can be performed each time a node 21-28 transitions from a inactive state (e.g., a "sleep" state or "off" state) to an active state (e.g., an "awake" state or an "on" state) or when a node 21-28 is connected to the network 15. Once the node 21-28 has selected (and linked to) a node management device 32-34, the node 21-28 can re-execute the process of FIG. 3 to ensure that the node 21-28 is still communicating with the most reliable node management device 32-34 for that node 21-28. In one embodiment, the node 21-28 can continuously execute the process of FIG. 3 to continuously determine the most reliable node management device 32-34 for the node 21-28 during operation. In another embodiment, the node 21-28 can periodically execute the process of FIG. 3 (e.g., once an hour) to periodically determine the most reliable node management device 32-34 for the node 21-28.

Figure 5:
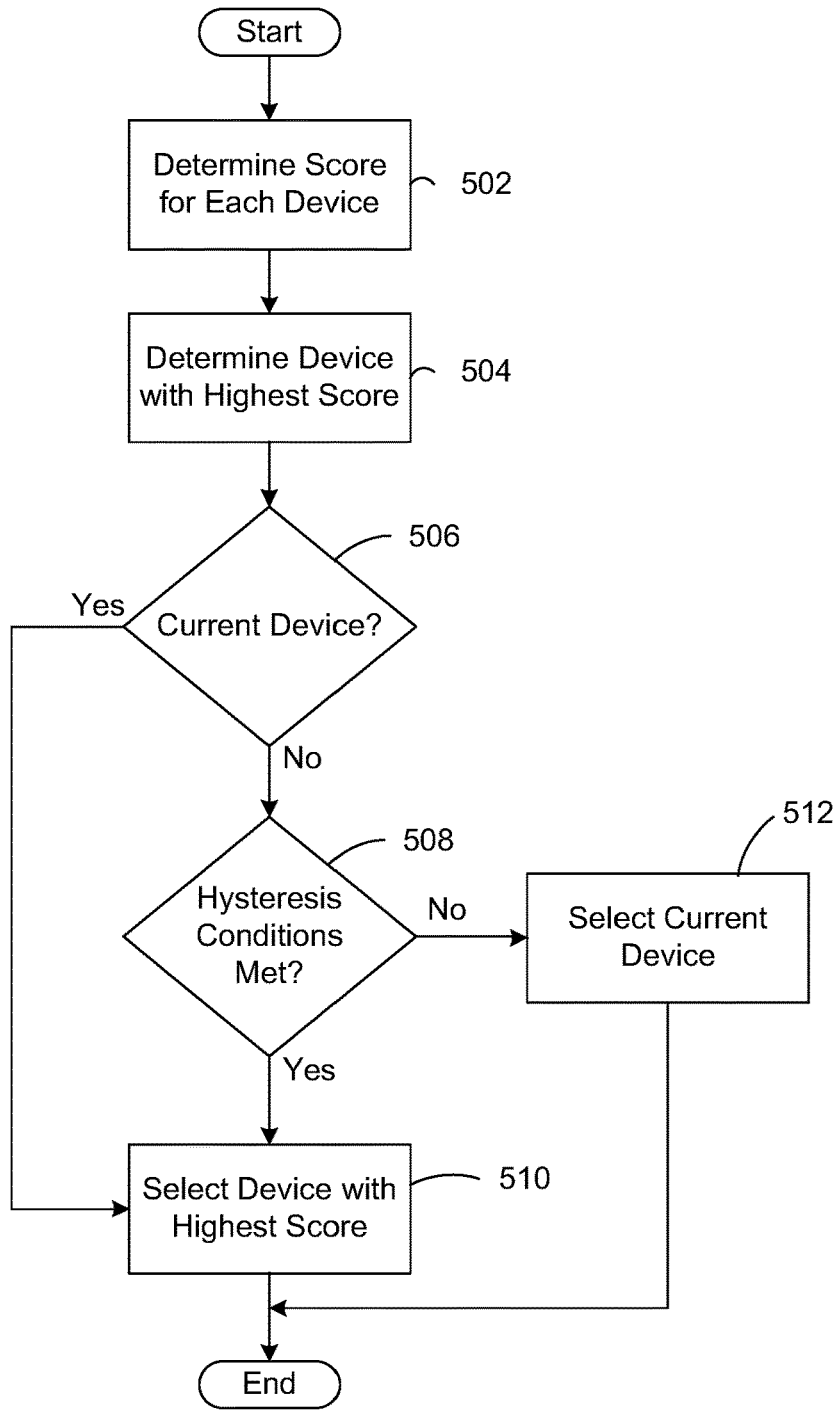
FIG. 5 shows an embodiment of a process for selecting a node management device.

FIG. 5 shows an embodiment of a process for the node 21-28 to select a node management device 32-34 such as in step 310 of FIG. 3. The process begins with the device selection logic 54 for the node 21-28 determining a "score" for each of the node management devices 32-34 transmitting an advertising message to the node 21-28 (step 502).

In one embodiment, the score can be based on the information stored in the table 100 for the node management device 32-34. In one embodiment, the score can be the number of advertising messages received by the node (e.g., the number of elements 102 storing a 1 in the table 100) during the evaluation period. In another embodiment, the score can be a percentage of advertising messages received by the node 21-28 since the node 21-28 knows (or is provided with) the number of advertising messages that were sent by the node management device 32-34 during the evaluation period. The percentage of advertising messages received by the node 21-28 can be calculated by dividing the number of elements 102 storing a 1 in the table 100 by the total number of elements 102 in the table 100.

In a further embodiment, the score can be a weighted percentage of advertising messages received by the node 21-28. The weighted percentage of advertising messages received by the node 21-28 can be calculated by dividing a sum of weighted stored values by a sum of a weighted number of elements 102. The sum of weighted stored values can be calculated by multiplying the stored value in each group by a corresponding predetermined weight for the group and then adding the weighted stored values. In one embodiment, the more recently received advertising messages (e.g., advertising messages stored in elements 102 closer to the most significant element 102) can have a greater weighting applied to the advertising messages than the corresponding weighting applied to advertising messages stored in elements 102 further from the most significant element 102. In addition, the weighting associated with an advertising messages stored in elements 102 can be decreased as the received advertising messages become older relative to the most recently received advertising message (e.g., advertising messages stored in elements 102 closer to the least significant element 102).

For example, using the table 100 of FIG. 4, the sum of weighted stored values can be calculated by multiplying the stored value in the first group of elements 111 by a first predetermined weight, multiplying the stored value in the second group of elements 112 by a second predetermined weight greater than the first predetermined weight and multiplying the stored value in the third group of elements 113 by a third predetermined weight greater than the second predetermined weight and adding the weighted stored values. The sum of the weighted number of elements can be calculated by multiplying the number of elements for each group by the predetermined weight for the group and adding the totals for each group. For example, using the table 100 of FIG. 4, the sum of the weighted number of elements can be calculated by adding the number of elements in the first group of elements 111 multiplied by the first predetermined weight, the number of elements in the second group of elements 112 multiplied by the second predetermined weight, and the number of elements in the third group of elements 113 multiplied by the third predetermined weight. In one embodiment corresponding to FIG. 4, the first predetermined weight can be 1, the second predetermined weight can be 2 and the third predetermined weight can be 4.

Next, the device selection logic 54 can determine the node management device 32-34 with the highest score (step 504). The node management device 32-34 with the highest determined score can correspond to the most reliable node management device 32-34 because the score is based on the number of advertising messages from that node management device 32-34 received by the node 21-28. In one embodiment, if more than 1 node management device 32-34 has an equivalent score, the device selection logic 54 can select a node management device 32-34 using one or more additional criteria. For example, the device selection logic 54 can select the closest node management device 32-34 with the equivalent score in response to several node management devices 32-34 having the equivalent score.

A determination can then be made by the device selection logic 54 as to whether the node management device 32-34 with the highest score is the node management device 32-34 currently linked with the node 21-28 (step 506). If the node management device 32-34 with the highest determined score is the same as the node management device 32-34 currently linked with the node 21-28, the process can proceed to select the node management device 32-34 with the highest score to be the node management device 32-34 for the node 21-28 (step 510). In one embodiment, if the node 21-28 is selecting a node management device 32-34 for the first time (i.e., there is no currently linked node management device 32-34 for the node 21-28), the process can select the node management device 32-34 with the highest score in step 510 immediately after determining the node management devices 32-34 with the highest score in step 504.

If the node management device 32-34 with the highest determined score is not the same as the node management device 32-34 currently linked with the node 21-28, the process can proceed to determine whether predetermined hysteresis conditions have been satisfied (step 508). The predetermined hysteresis conditions can be established to control the frequency for changing the linked node management device 32-34 of the node 21-28. The greater the requirements in the predetermined hysteresis conditions, the less frequently the linked node management device 32-34 for the node 21-28 can be changed. In one embodiment, the predetermined hysteresis condition can require that the node management device 32-34 with the highest score have a score that is greater than the score for the currently linked node management device 32-34 by a predetermined amount (e.g., 20%). The predetermined amount can be based on the number of elements 102 in the table 100 and the desired frequency of changing node management devices 32-34. In another embodiment, the predetermined hysteresis conditions can be set such that the node management device 32-34 with the highest score is always selected.

If the predetermined hysteresis conditions have been satisfied, the device selection logic 54 can select the node management device 32-34 with the highest score to be the node management device 32-34 for the node 21-28 (step 510). However, if the predetermined hysteresis conditions have not been satisfied, the device selection logic 54 can select the currently linked node management device 32-34 for the node 21-28 to remain the node management device 32-34 for the node 21-28 (step 512).

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method for selecting node management devices in a wireless network, the method comprising:
   receiving by a node of the wireless network at least one advertising message of a plurality of advertising messages transmitted by a plurality of node management devices;
   storing, by the node, information in a table, wherein the stored information is related to the receipt of the at least one advertising message;
   analyzing the stored information in the table to generate scores respectively corresponding to the plurality of node management devices, wherein each of the scores is based on a number of advertising messages received by the node from the corresponding node management device;
   comparing the scores;
   selecting a node management device of the plurality of node management devices based on the comparing; and
   linking to the selected node management device by the node such that the selected node management device manages the node.

2. The method of claim 1, wherein the transmitting a plurality of advertising messages, the receiving at least one advertising message and the storing information are repeated for an evaluation period.

3. The method of claim 2, wherein the transmitting a plurality of advertising messages includes transmitting the plurality of advertising messages at a predetermined interval, wherein the predetermined interval is less than the evaluation period.

4. The method of claim 3, wherein the storing information in a table includes:
   providing an array for each node management device of the plurality of node management devices, wherein the array is configured to have a predetermined number of elements corresponding to a number of predetermined intervals within the evaluation period; and
   storing information in an element of the array corresponding to a predetermined interval for the transmitted advertising message.

5. The method of claim 4, wherein the storing information in a table includes:
   identifying the node management device that transmitted the at least one received advertising message; and
   storing information about the at least one received advertising message in the array corresponding to the identified node management device.

6. The method of claim 4, wherein storing information in an element of the array includes storing a first value in the element in response to the node receiving an advertising message and storing a second value in the element in response to no advertising message being received by the node during the predetermined interval.

7. The method of claim 4, wherein the storing information in an element of the array includes:
   removing the stored information from a first end element of the array;
   shifting the stored information in the other elements of the array toward the first end element; and
   storing information in a second end element of the array opposite the first end element, wherein the stored information is related to the receipt of an advertising message.

8. The method of claim 1, further comprising:
   determining whether the selected node management device is linked to the node;
   determining whether a predetermined change condition has been satisfied in response to the selected node management device not being linked to the node; and
   wherein the linking to the selected node management device occurs in response to the predetermined change condition being satisfied.

9. A wireless network comprising:
   a plurality of node management devices, each node management device of the plurality of node management devices configured to transmit an advertising message;

a plurality of nodes, each node of the plurality of nodes communicatively coupled to at least one of a node of the plurality of nodes or a node management device of the plurality of node management devices, each node of the plurality of nodes configured to receive at least one advertising message from a node management device, and each node of the plurality of nodes comprising:

a table, the table configured to store information about a number of advertising messages received by the node from each node management device of the plurality of node management devices; and a processor, the processor configured to compare the stored information related to the number of advertising messages received by the node from each node management device and select a node management device of the plurality of node management devices based on the comparison, wherein the selected node management device manages the node.

10. The network of claim 9, wherein the advertising messages are transmitted at a preselected interval by the plurality of node management devices.

11. The network of claim 9, wherein the advertising messages include information identifying the node management device transmitting the advertising message.

12. The network of claim 9, wherein the table includes an array for each node management device of the plurality of node management devices, wherein each array includes a predetermined number of elements corresponding to a predetermined number of advertising messages sent by the node management device.

13. The network of claim 12, wherein the processor is configured to store information related to the receipt, by the node, of an advertising message sent by a node management device in a corresponding element in the array corresponding to the node management device.

14. The network of claim 13, wherein the processor is configured to store a 1 in the corresponding element in response to receiving an advertising message and storing a 0 in the corresponding element in response to no advertising message being received.

15. The network of claim 14, wherein the processor is configured to calculate a score for a node management device by dividing the number of elements with a 1 in the corresponding array for the node management device by the predetermined number of elements in the corresponding array for the node management device.

16. The network of claim 15, wherein the processor is configured to multiply each element of the corresponding array for the node management device by a predetermined weight for that element.

17. The network of claim 9, wherein the processor is configured to continuously make a selection of the node management device of the plurality of node management devices based on the comparison of the stored information in the table, wherein the selection of the node management device is performed in response to an expiration of an evaluation period.

18. The network of claim 17, wherein the processor is configured to use hysteresis in selecting a node management device at the expiration of the corresponding evaluation period.

19. A method, comprising:

receiving at a node of a network a plurality of advertising messages from a plurality of node management devices, including at least a first node management device and a second node management device;

determining by the node a first value based on a number of advertising messages received by the node from the first node management device during a first time period;

determining by the node a second value based on a number of advertising messages received by the node from the second node management device during a second time period;

comparing the first value and the second value;

selecting one of the plurality of node management devices based on the comparing; and linking to the selected node management device by the node such that the selected node management device manages the node.

20. The method of claim 19, wherein the first time period and the second time period overlap.

* * * * *